(12) United States Patent
Dugeon et al.

(10) Patent No.: US 8,769,630 B2
(45) Date of Patent: Jul. 1, 2014

(54) MONITORING METHOD AND DEVICE

(75) Inventors: Olivier Dugeon, Pleumeur Bodou (FR); Mohamed Mahdi, Antonny (FR); Rémi Bars, Louannec (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/517,028

(22) PCT Filed: Dec. 14, 2010

(86) PCT No.: PCT/FR2010/052719
§ 371 (c)(1),
(2), (4) Date: Jun. 18, 2012

(87) PCT Pub. No.: WO2011/073569
PCT Pub. Date: Jun. 23, 2011

(65) Prior Publication Data
US 2012/0278864 A1 Nov. 1, 2012

(30) Foreign Application Priority Data
Dec. 18, 2009 (FR) ...................................... 09 59255

(51) Int. Cl.
*G06F 17/30* (2006.01)
*H04L 29/06* (2006.01)
(52) U.S. Cl.
CPC .............. *H04L 29/06* (2013.01); *H04L 63/102* (2013.01); *H04L 63/029* (2013.01)
USPC .......................................................... 726/4
(58) Field of Classification Search
USPC .......................................................... 726/4
See application file for complete search history.

(56) References Cited

U.S. PATENT DOCUMENTS

| 8,356,337 | B2* | 1/2013 | Scott et al. | ......................... 726/4 |
| 2009/0089353 | A1* | 4/2009 | Fukuta et al. | ................. 709/201 |
| 2010/0333128 | A1* | 12/2010 | Smith et al. | ..................... 725/25 |

FOREIGN PATENT DOCUMENTS

WO   WO 2009/113931   9/2009

* cited by examiner

*Primary Examiner* — Teshome Hailu
*Assistant Examiner* — Abiy Getachew
(74) *Attorney, Agent, or Firm* — Cozen O'Connor

(57) ABSTRACT

The method of the invention comprises:
a step of receiving a message (M1) sent by a user (T-B) of the first network, said message containing an access rule authorizing a user of a second network to access at least one multimedia content, said content being indexed with a content server (MS-B2) of the first network;
a step of sending a first notification message (M2) to a trusted entity (PFS) managing the interface between the first network (NW-B) and the second network (NW-A), the first notification message (M2) containing a remote access rule (RAD) authorizing said user of the second network to access multimedia contents belonging to said user of the first network; and
a step of commanding a gateway (HGW-B) of the first network (NW-B) by means of a local access rule configuring said gateway, such that said gateway transmits a catalog of contents to which said user of the second network is authorized to access on reception of an access request relating to said catalog coming from said user of the second network via said trusted entity (PFS).

14 Claims, 8 Drawing Sheets

| | | |
|---|---|---|
| P-A { | Alice | ID-A, PWD-A<br>@IP-A<br>RAD ←→ ID-B<br>Name-NW-A |
| P-B { | Bob | ID-B, PWD-B<br>@IP-B<br>Name-NW-B |
| | ... | |

DB

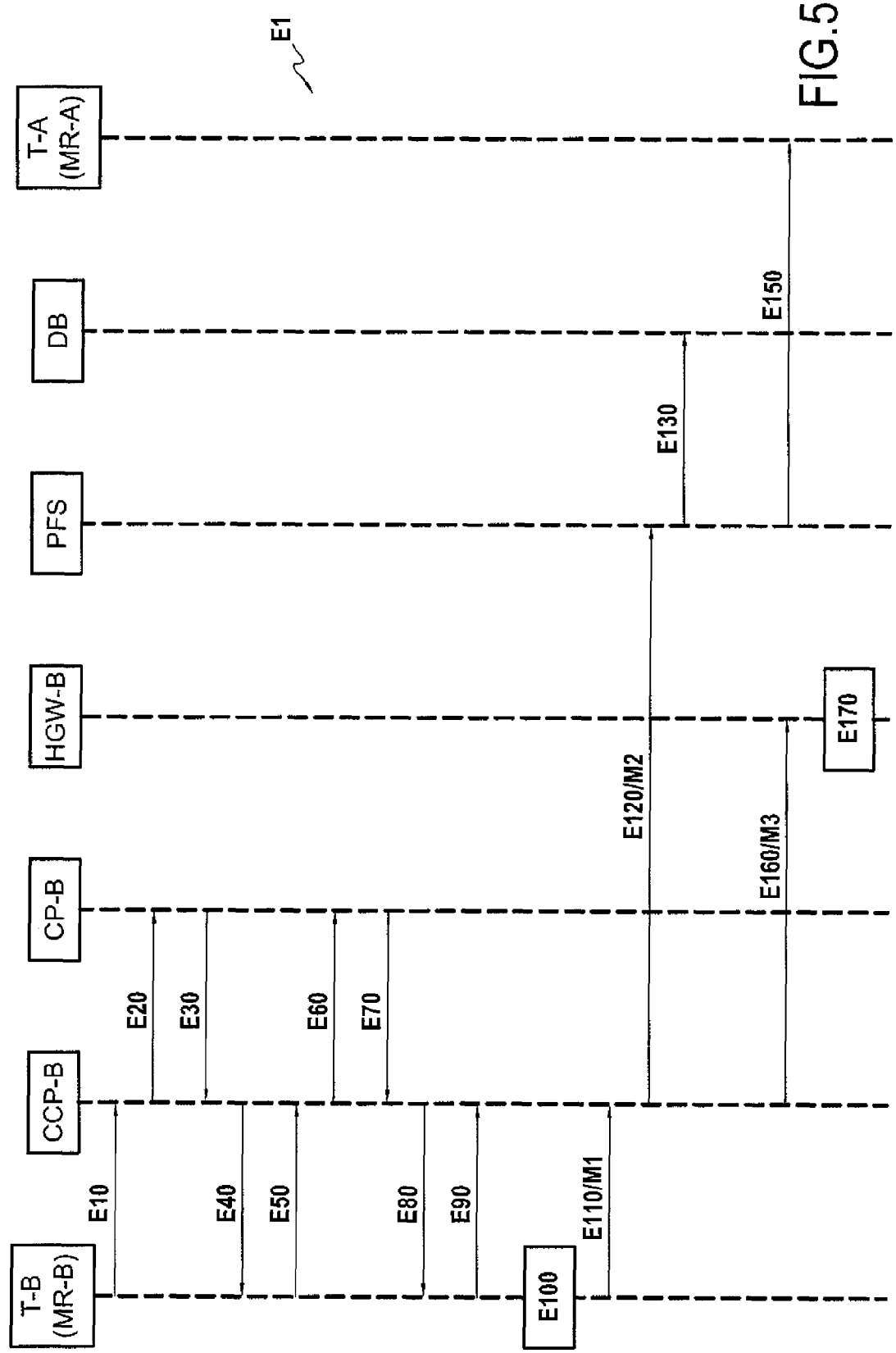

MONITORING METHOD AND DEVICE

RELATED APPLICATIONS

This is a U.S. National Phase Application under 35 USC §371 of International Application PCT/FR2010/052719, filed on Dec. 4, 2010.

This application claims the priority of French application no. 09/59255 filed on Dec. 18, 2009, the content of which is hereby incorporated by reference.

BACKGROUND OF THE INVENTION

The present invention relates to the field of telecommunications networks in which terminals communicate via the UPnP protocol as defined by the UPnP (universal plug & play) Forum. By way of example, the network may be a home network or a local network.

In known manner, the UPnP audio/video (A/V) service carried by this protocol seeks to provide interoperability and interconnection between pieces of multimedia equipment without requiring them to be configured by the user. In particular, the user can easily make use of this protocol to share contents between the various pieces of multimedia equipment in the user's home network (e.g. sharing photographs between a game console and a mobile terminal). It should be observed that the term "sharing contents" is used herein to mean giving access to those contents, so as to be able to consult them, view them, execute them, download them, etc.

In the description below, reference is made to the UPnP A/V service to designate a set of pieces of multimedia equipment that are mutually interconnected by a local or home network and that use the UPnP protocol for communicating with one another over the network.

A device (e.g. a control device, a content server, a terminal, etc.) is said to be a UPnP A/V device if it complies with the UPnP A/V standard or with any other equivalent or derived standard, in particular if it uses a command protocol in accordance with such a standard.

In general, in architectures of the UPnP A/V service, a distinction is made between different types of UPnP A/V device: control devices known as digital media controllers (DMCs); content servers known as digital media servers (DMSs); and content playback devices known as digital media renderers (DMRs), digital media adapters (DMAs), and digital media players (DMPs).

In a UPnP A/V service, the control device DMC performs a role that is central since it serves to discover the other UPnP A/V devices of the network, and the services offered by those devices, and it serves to put a DMS server into communication with a playback device DMR, DMA, or DMP so that the device plays back a multimedia content indexed by the DMS server.

Historically, the UPnP A/V service has been used for exchanging local multimedia contents between different pieces of equipment of a home network in which they were hosted. However nowadays a desire is becoming apparent to share multimedia contents between the equipments of remote home networks.

In response to this expectation, in the context of its "remote access" working group, the UPnP Forum has proposed a new service based on virtual private network (VPN) technology. In known manner, that technology guarantees a high level of security for exchanges of contents between the remote networks.

Nevertheless, the solution proposed by the UPnP Forum needs to manage problems of Internet protocol (IP) address conflicts between the various home networks for which it is managing the interface. Since the addressing plans of home networks are private, it is common practice for them to be identical, at least in part. Similarly, managing and exchanging authentication keys for establishing VPN tunnels is a problem for which there is not at present any satisfactory solution.

There therefore exists a need for a solution that enables contents to be shared in secure manner between remote networks without suffering from those drawbacks.

OBJECT AND SUMMARY OF THE INVENTION

The present invention satisfies this need by entrusting the putting into communication of remote local networks that seek to share contents to a trusted entity that is situated at the interface between those networks. By way of example, the trusted entity may be located in an external network to which both local networks have access via access gateways such as a "home gateway".

Advantageously, the invention proposes setting up a mechanism in the trusted entity for securing exchanges between the remote networks by setting up a procedure for certifying that there exists a rule for authorizing a user to access contents of the remote local network.

In the description below, and for simplification purposes, the same term is used to identify the user of the terminal and the terminal that allows the user to access contents.

Various entities co-operate in securing exchanges between the remote local networks in accordance with the invention: the trusted entity and also control devices situated in each of the local networks and the access gateways constituting the interfaces between those control devices and the trusted entity.

It should be observed that the invention applies in preferred manner to sharing contents between remote local networks. Nevertheless, the invention also applies to sharing contents between a local network and roaming equipment that includes a router modem that complies with a third-generation mobile telecommunications standard or that includes a WiFi interface, and that acts as a gateway giving access to the network of the trusted entity via a third-generation mobile telecommunications network or via a WiFi "hotspot".

Thus, in a first aspect, the invention provides a method of implementing an interface between a first network and a second network, the method being implemented by a trusted entity and said method comprising:

a step of receiving a notification message from a control device of the first network, the notification message containing a remote access rule authorizing a user of the second network to access multimedia contents of a user of the first network;

a step of receiving an access request, coming from said user of the second network relating to at least one multimedia content of said user of the first network;

a verification step seeking to verify that said user is authorized to access multimedia contents of said user of the first network by means of the remote access rule;

if said user of the second network is so authorized, a transfer step of transferring the access request to a gateway of the first network; and else a step of rejecting the request.

In corresponding manner, the invention also provides a trusted entity implementing an interface between a first network and a second network, the entity comprising:

means for receiving a notification message from a control device of the first network, said message containing a remote access rule authorizing a user of the second network to access multimedia contents of a user of the first network;

means for receiving an access request from a user of the second network relating to at least one multimedia content of a user of the first network indexed in the first network;

verification means for verifying that said user of the second network is authorized to access multimedia contents of said user of the first network by means of the remote access rule;

means for transferring the access request to a gateway of the first network, which means are activated if said user of the second network is authorized; and means for rejecting the request that are activated if the user is not authorized.

In preferred manner:

the first and second networks are local or home networks;

the trusted entity is hosted by a services supplier located in a network that is external to the first and second networks. In particular, the services supplier may form part in particular of an Internet or Intranet type network; and the gateway is a home or residential gateway enabling the first network to communicate with the trusted entity.

Thus, access to multimedia content hosted in the first network is controlled by the trusted entity as a function of a remote access rule established by the first network.

This remote access rule serves to filter those users of the second network that are entitled to access contents of a user of the first network.

The invention thus makes it possible to benefit from the security and the authentication procedures inherent to the service supplier hosting the trusted entity in order to guarantee security for the exchanges between the remote networks.

Furthermore, the invention does not suffer from problems of conflicting addresses in the two networks: the trusted entity is configured in such a manner as to transfer the request for access from users authorized to access contents hosted in the first network to the access gateway of the first network. As is known to the person skilled in the art, the gateway has a public IP address that identifies it in unique manner.

Furthermore, the invention makes it possible to mask the server that indexes the content: direct access to the content server by the terminal of the second network is not allowed since the request to access the terminal transits via the trusted entity.

In a particular implementation, the request coming from the terminal of the second network is transported using the HTTP protocol or the HTTPS protocol.

Exchanges between the two remote networks thus benefit from procedures for authenticating and securing exchanges that are specific to the HTTPS protocol. Furthermore, when the invention is used to allow contents to be shared between UPnP A/V equipments, and given that the UPnP A/V protocol already has provision for transporting multimedia contents using the HTTP protocol, the invention requires little adaptation.

In a particular implementation of the invention, the method of implementing an interface further comprises, prior to the transfer step, a step of authenticating the user of the second network, the transfer step being implemented once the user of the second network has been validly authenticated.

This authentication adds an additional degree of security to exchanges between the remote networks.

In a second aspect, the invention also provides a treatment method implemented by a gateway of a first network, which method comprises:

a configuration step of configuring the first network by means of a local access rule received from a control device of the first network, and configuring the gateway so that, on receiving an access request from a user of the second network via a trusted entity forming an interface between the first network and the second network, with said request relating to a catalog of multimedia contents of a user of the first network, said gateway transmits said catalog of multimedia contents that said user of the second network is authorized to access;

on reception of a request to access the catalog of contents coming from said user of the second network, a verification step seeking to verify that the user of the second network is authorized to access the catalog;

if said user of the second network is so authorized:
a step of obtaining the catalog; and
a step of sending said catalog to said trusted entity; and
else a step of rejecting the request.

Correspondingly, the invention also provides a gateway of a first network comprising:

means for configuring the first network by means of a local access rule received from a control device of the first network, adapted to configure the gateway so that, on receiving an access request from a user of the second network via a trusted entity forming an interface between the first network and the second network, with said request relating to a catalog of multimedia contents of a user of the first network, said gateway transmits said catalog of contents that said user of the second network is authorized to access;

verification means, activated on reception of a request to access the catalog of contents coming from a user of the second network, and serving to verify whether the user of the second network is authorized to access the catalog;

means activated if said user of the second network is so authorized:
to obtain the catalog; and
to send the catalog to said trusted entity; and
means activated to reject the request if said user is not authorized.

Thus, the gateway is advantageously configured so as to accept requests to access a content catalog of the first network exclusively when they come from said trusted entity, and to supply the catalog to that entity. As a result, it is ensured that exchanges of contents between the remote networks transit via the trusted entity.

The gateway contributes to broadcasting the catalog of contents shared by the first network to the trusted entity. Advantageously, the trusted entity may transmit the catalog to the user of the second network so that the user can browse the catalog and select content that the user desires to access.

Thus, the gateway serves not only to filter those users that are entitled to access contents of the first network, but also to filter which contents are proposed to those users, by means of a catalog of contents.

Nevertheless, it should be observed that although the catalog of contents is made available for consultation by a user of the second network, that user does not know where the catalog is situated. The invention takes care to avoid publishing the content servers that hold contents for sharing. No direct access to those contents is possible without previously being put into communication by means of the trusted entity.

In addition, access to the catalog of contents in the first network is made available by the gateway only to authorized users that satisfy a local access rule set up by the first network. This constitutes a second access control, this time performed by the gateway. This second access control makes it possible to reject requests coming from terminals that have managed to usurp the identity of the trusted entity and to access the gateway by passing themselves off as the trusted entity.

In a particular implementation, the configuration step is implemented on reception of a notification message including the local access rule and a redirection rule whereby the gateway transfers to a content server a received request to access a determined content.

As a result, the gateway transfers directly to the content server in question any request it has received from the user of the second network and relating to content indexed by that server.

In a particular implementation of the invention, the treatment method further comprises:
- a step of reconfiguring the gateway with the help of a redirection rule whereby the gateway accepts a request for access to a multimedia content received from a user of the second network and transfers it to the server indexing the content; and
- a step of sending an IP address of the gateway to the user of the second network via the trusted entity.

This redirection rule is in addition to the local access rule received from the control device of the first network, whereby all requests relating to a catalog of contents in the first network necessarily pass via the trusted entity.

This redirection rule thus authorizes the user of the second network to have direct access to the content the user wishes to access. This advantageously simplifies the procedure for accessing the content, in particular by avoiding overloading the trusted entity or the gateway.

Multimedia contents are thus exchanged directly between the terminal of the user of the second network and the content server of the first network via the respective gateways of the two remote networks. Consequently, the invention can easily be deployed on a large scale, unlike VPN solutions that are relatively complex to implement in such a context and that can suffer from performance problems when there is an increase in load.

Nevertheless, it should be observed that direct access by the user to the content of the first network is allowed only after the two networks have been put into communication via the trusted entity. In other words, the direct access is not allowed without verifying that the user is authorized to access the content by a remote access rule. Consequently, direct access is allowed to the terminal only when the terminal appears to be reliable.

In a third aspect, the invention provides a control method implemented by a control device of a first network, the method comprising:
- a step of receiving a message sent by a user of the first network, said message containing an access rule authorizing a user of a second network to access at least one multimedia content, the content being indexed with a content server of the first network;
- a step of sending a first notification message to a trusted entity managing the interface between the first network and the second network, the first notification message containing a remote access rule authorizing said user of the second network to access contents belonging to said user of the first network; and
- a first command step of commanding a gateway of the first network by means of a local access rule configuring said gateway, such that said gateway transmits a catalog of contents that the user of the second network is authorized to access on reception of an access request relating to the catalog coming from said user of the second network via said trusted entity.

Correspondingly, the invention also provides a control device for controlling a first network, the device comprising:
- means for receiving a message sent by a user of the first network, the message containing an access rule authorizing a user of a second network to access at least one multimedia content, the content being indexed with a content server of the first network;
- means for sending to a trusted entity constituting an interface between the first network and the second network, the first notification message containing a remote access rule authorizing a user of the second network to access multimedia contents belonging to a user of the first network; and
- command means for commanding a gateway of the first network by means of a local access rule configuring said gateway, such that said gateway transmits a catalog of contents that a user of the second network is authorized to access on reception of an access request relating to said catalog coming from a user of the second network via said trusted entity.

Thus, the control device of the invention, on receiving authorization to share a content as determined by the user of the first network, serves firstly to configure the trusted entity with a remote access rule enabling it to filter users desiring to access its contents, and secondly to configure the gateway to which the trusted entity transfers the request for access to catalogs of contents coming from users of the second network so that the gateway transmits the catalogs to the users.

The control method and device of the invention thus present advantages similar to the method and device for implementing the interface between the remote networks in that it enhances the security of exchanges by configuring the trusted entity and the gateway.

In a particular implementation, the first command step comprises sending a second notification message including the local access rule and a redirection rule whereby the gateway transfers a received request for access to a determined content to a content server.

The new configuration of the gateway enables the gateway to transmit directly to the content server in question the requests for access coming from the user of the second network.

In a particular implementation, the control method further comprises:
- a first step of sending a list to the user of the first network, the list including at least one content server of the first network indexing multimedia contents; and
- on reception of a selection of a server in said list made by the user of the first network, a step of sending to that user a list of multimedia contents indexed with said server in order to enable at least one multimedia content to be selected that the user of the first network authorizes a user of the second network to access.

Thus, the control method of the invention also manages selecting the contents and the servers that the user of the first network desires to share with a user of the second network. The control device of the invention is thus suitable, in this implementation, for announcing the catalogs of contents and the contents of the first network.

In a particular implementation, the control method further comprises:
- a step of detecting the end of access to a multimedia content by the user of the second network; and
- a second command step of configuring the gateway so as to deactivate a redirection rule applied by the gateway and whereby the gateway transfers to the server indexing the multimedia content, a request for access to said content as received from a user of the second network.

As a result, it is possible to terminate direct access by the user of the second network to the content hosted in the first network.

In a fourth aspect, the invention provides a transfer method implemented by a control device of a first network, the method comprising:

on reception of an access request from a user of the first network relating to at least one multimedia content of a user of a second network that the user of the first network is authorized to access by an access rule, a step of interrogating a trusted entity forming an interface between the first network and the second network in order to obtain a catalog of contents; and a step of transferring a request to access a multimedia content selected by the user from the catalog, the request coming from the user of the first network and going to the trusted entity.

Correspondingly, the invention provides a control device of a first network, the device comprising:

means activated on reception of an access request from a user of the first network relating to at least one multimedia content of a user of a second network that the user of the first network is authorized to access by an access rule, to interrogate a trusted entity forming an interface between the first network and the second network in order to obtain a catalog of contents; and means for transferring a request to access a multimedia content selected from the catalog, the request coming from the user of the first network and going to the trusted entity.

In a particular implementation, the various steps of the method of implementing an interface, of the treatment method, of the control method, and of the transfer method are determined by computer program instructions.

Consequently, the invention also provides computer programs on a data medium, the programs being suitable for being implemented in a trusted entity, a gateway, a control device, or more generally in a computer, the programs including instructions adapted to implement the steps of the method of implementing an interface, the treatment method, the control method, and the transfer method as described above.

These programs may use any programming language and be in the form of source code, object code, or code intermediate between source code and object code, such as in a partially compiled form, or in any other desirable form.

The invention also provides computer readable data media including computer program instructions such as those mentioned above.

The data media may be any kind of entity or device capable of storing the program. For example, the media may comprise storage means such as a read only memory (ROM), e.g. a compact disk (CD) ROM or a microelectronic circuit ROM, or indeed magnetic recording means, e.g. a floppy disk or a hard disk.

Furthermore, the data media may be transmissible media such as an electrical or optical signal, suitable for being conveyed via an electrical or optical cable, by radio, or by other means. The programs of the invention may, in particular, be downloaded from an Internet type network.

Alternatively, the data media may comprise an integrated circuit in which the program is incorporated, the circuit being adapted to execute or to be used in the execution of the methods in question.

In other implementations or embodiments it is also possible to envisage that the method of implementing an interface, the treatment method, the control method, and the transfer method, and also the trusted entity, the gateway, and the control devices of the invention may present in combination all or some of the above-specified characteristics.

BRIEF DESCRIPTION OF THE DRAWINGS

Other characteristics and advantages of the present invention appear from the following description made with reference to the accompanying drawings, which show an implementation having no limiting character. In the figures:

FIGS. 5, 6A, 6B, 6C, and 7 show the main steps of methods of implementing an interface, for treatment, for control, and for transfer in accordance with the invention, in a particular implementation.

DETAILED DESCRIPTION OF AN EMBODIMENT

Figure 1:
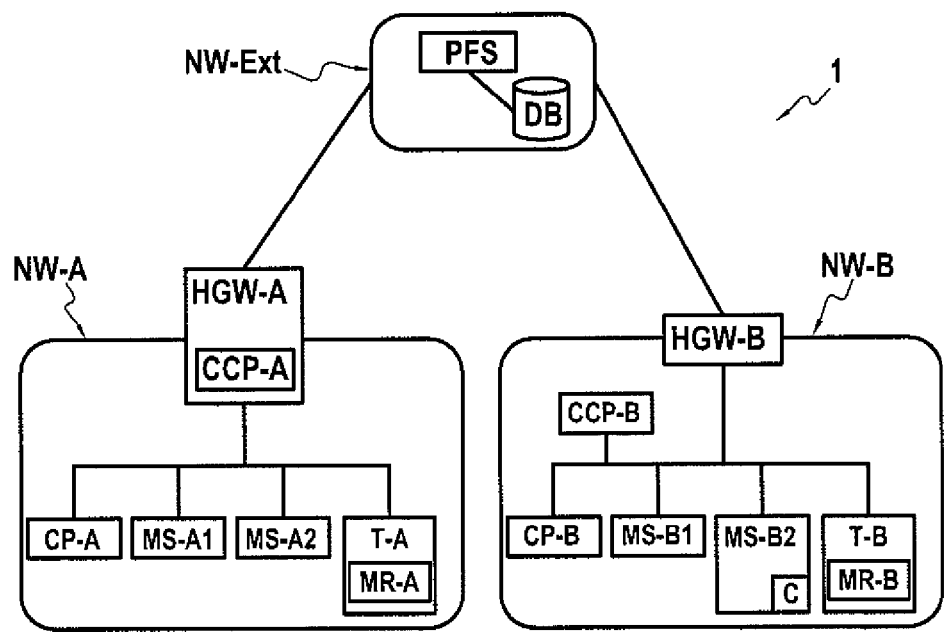
FIG. 1 shows a telecommunications system in its environment, the system comprising a trusted entity, gateways, and control devices in accordance with the invention, in a particular embodiment.

FIG. 1 shows a telecommunications system 1 in its environment, the system enabling two remote local telecommunications networks NW-A and NW-B belonging to respective users Alice and Bob to share multimedia contents such as photographs, data files, videos, etc.

More precisely, it is assumed herein that Bob desires to share with Alice a multimedia content C hosted in Bob's network NW-B. In other words, Bob wishes to enable Alice to access the content C.

Bob's network NW-B is a local network comprising a set of pieces of multimedia equipment that are mutually interconnected by interfaces of the Ethernet, WiFi, and/or PLC type, and that use the UPnP protocol for communicating over the network.

These pieces of equipment include in particular:

a terminal UPnP T-B that incorporates a playback server MR-B;

a control point CP-B; and

UPnP content servers MS-B1 and MS-B2. The content C is indexed by the server MS-B2.

These various entities are known to the person skilled in the art, and are therefore not described in further detail herein.

It should be observed that T-B, CP-B, MS-B1, and MS-B2 correspond in this example to distinct pieces of equipment.

In a variant, the logical functions implemented by these pieces of equipment may be implemented by a single piece of equipment. For example, the control point CP-B may be incorporated in the terminal T-B.

The terminal T-B may be a computer, a TV set, a mobile telephone, or any other device supporting the UPnP A/V and/or digital living network appliance (DLNA) service.

Within the local network NW-B there is also a control device CCP-B in accordance with the invention.

This control device has the hardware architecture of a computer.

Figure 2A:
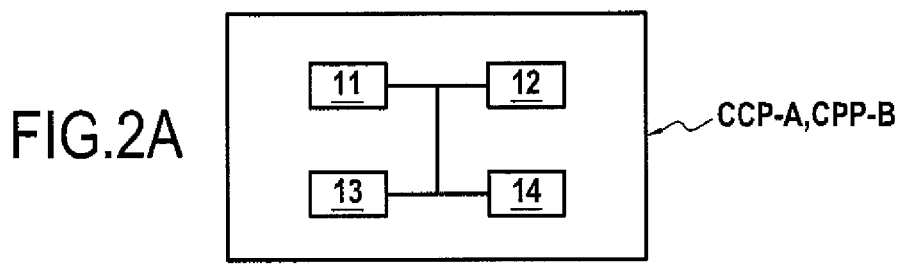
FIGS. 2A, 2B, and 2C show respectively, in a particular embodiment, the hardware architecture of a control device, of a router, and of a trusted entity in accordance with the invention.

With reference to FIG. 2A, it comprises in particular a processor 11, RAM 12, and ROM 13.

The ROM 13 constitutes a recording medium in accordance with the invention, which is readable by the processor 11 of the control device and which has recorded therein a computer program in accordance with the invention, including instructions for executing the steps of a control method and instructions for executing the steps of a transfer method of the invention, as described below.

The control device CCP-B also includes communications means 14 for communicating via the network NW-B and with entities of an external network NW-Ext, via a home gateway HGW-B in accordance with the invention. The communications means 14 comprise in particular a network interface complying with standards that are known to the person skilled in the art, together with means enabling it to communicate using the UPnP and HTTPS protocols. The control device CCP-B may also be incorporated in another home network device such as the gateway HGW-B or the server MS-B.

In this example, the external network NW-Ext is the public Internet.

The local network NW-B is connected to the external network NW-Ext via the home gateway HGW-B.

In this example, the gateway HGW-B has the hardware architecture of a computer.

Figure 2B:
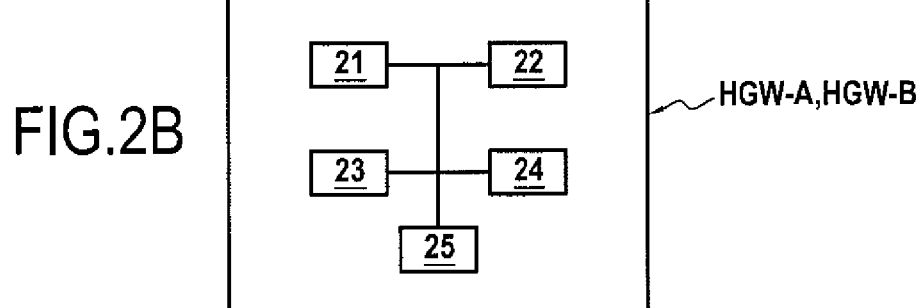

With reference to FIG. 2B, the home gateway HGW-B comprises in particular a processor 21, RAM 22, and ROM 23.

The ROM 23 constitutes a recording medium in accordance with the invention, which is readable by the processor 21 of the gateway and which has recorded thereon a computer program in accordance with the invention including instructions for executing the steps of a treatment method of the invention, as described below.

The gateway HGW-B also includes communications means 24 for communicating with the equipment of the network NW-B (incorporating one or more network interfaces of the Ethernet, PLC, and/or WiFi type), communications means 25 for communicating with the external network NW-Ext (incorporating in particular an ADSL, Ethernet, and/or optical interface), that are themselves known, and also means enabling it to communicate with the UPnP and HTTPS protocols.

In the presently-described example, Alice's network NW-A is of a structure that is identical to that of the network NW-B.

Thus, network NW-A is a local network having a set of pieces of multimedia equipment that are mutually interconnected by interfaces of the Ethernet, WiFi, and/or PLC type, and that use the UPnP protocol for communicating over the network.

These pieces of equipment include in particular a terminal UPnP T-A incorporating a playback server MR-A, a control point CP-A, and UPnP content servers MS-A1 and MS-A2.

The terminal T-A may be a computer, a TV set, a mobile telephone, or any other device supporting the UPnP A/V and/or DLNA service.

The local network NW-A is connected to the external network NW-Ext via a home gateway HGW-A in accordance with the invention. The home gateway HGW-A is of architecture similar to that of the home gateway HGW-B shown in FIG. 2B.

This home gateway HGW-A incorporates a control device CCP-A in accordance with the invention, and has architecture similar to that of the control device CCP-B shown in FIG. 2A.

In accordance with the invention, the implementation of the interface between the local networks HGW-A and HGW-B is entrusted to a trusted entity PFS located in the network NW-Ext and in accordance with the invention.

The trusted entity PFS in this example is a service platform hosted by a service supplier to which the users Bob and Alice have previously registered subscriptions in order to enable contents stored on their respective local networks to be shared between their UPnP terminals. Subscription may take place in particular via the web site of the service supplier.

During this subscription, Bob and Alice using their terminals T-B and T-A supplied identification data and authentication data. More precisely, in this example, each of Alice and Bob supplied an electronic address or email address (an "identifier" in the meaning of the invention) and a password, together with the appropriate domain name system (DNS) domain names specifying their respective home networks.

Figures 2C, 3:
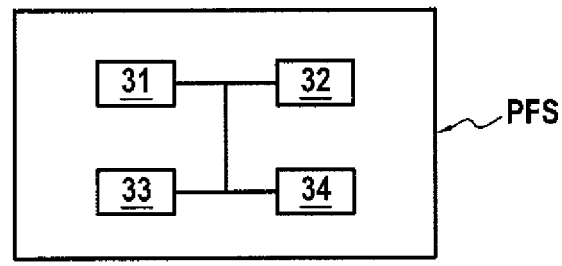
FIG. 3 shows a database connected to the trusted entity in accordance with the invention and including user profiles.

The email address ID-A, the password PWD-A, and the name Name-NW-A of Alice's network NW-A were stored during subscription in a user profile for Alice, written P-A. The profile P-A is stored in an authentication database DB of the service supplier, as shown in FIG. 3.

The data is also associated in the profile P-A with the public IP address @IP-A of the gateway HGW-A as extracted by the platform PFS from messages sent by the terminal T-A during subscription and updated by the gateway via the DNS Update protocol, as specified by the IETF in document RFC 2136, known to the person skilled in the art.

In similar manner, the email address ID-B, the password PWD-B, and the name Name-NW-B of Bob's network NW-B are included in Bob's user profile, written P-B, and stored in the database DB. This data is also associated in the profile P-B with the public IP address @IP-B of the gateway HGW-B and updated by the gateway via the DNS Update protocol.

In accordance with the invention, the services platform PFS performs the role of an authenticating proxy server. In the implementation described herein, this function is provided by the platform PFS using the hypertext transfer protocol secure (HTTPS) protocol.

In known manner, the HTTPS protocol implements party authentication services with the help of authentication certificates. It also guarantees the authenticity and the confidentiality of the data that is exchanged, by setting up an encrypted session between the parties using the secure socket layer (SSL) or the transport layer security (TLS) protocols. The principle on which the HTTPS protocol operates is known to the person skilled in the art and is not described in further detail herein.

It is assumed that the authentication certification needed for the SSL/TLS protocols were exchanged between the terminals T-A and T-B and the platform PFS while the users Alice and Bob were subscribing.

The services platform PFS in this example has the hardware architecture of a computer.

With reference to FIG. 2C, it comprises in particular a processor 31, RAM 32, ROM 33, and communications means 34 for communicating with the networks NW-A and NW-B, that are themselves known.

The ROM 33 constitutes a recording medium in accordance with the invention that is readable by the processor 31 of the services platform PFS and that has recorded thereon a computer program in accordance with the invention including instructions for executing the steps of a method of implementing an interface of the invention.

There follows a description with reference to FIGS. 4A-4C, 5, GA, 6B, and 7 of the main steps in the control method, the method of implementing an interface between the networks NW-A and NW-B, the treatment method, and the transfer method in accordance with the invention in a particular implementation in which these methods are implemented by the system 1.

Figure 6A:
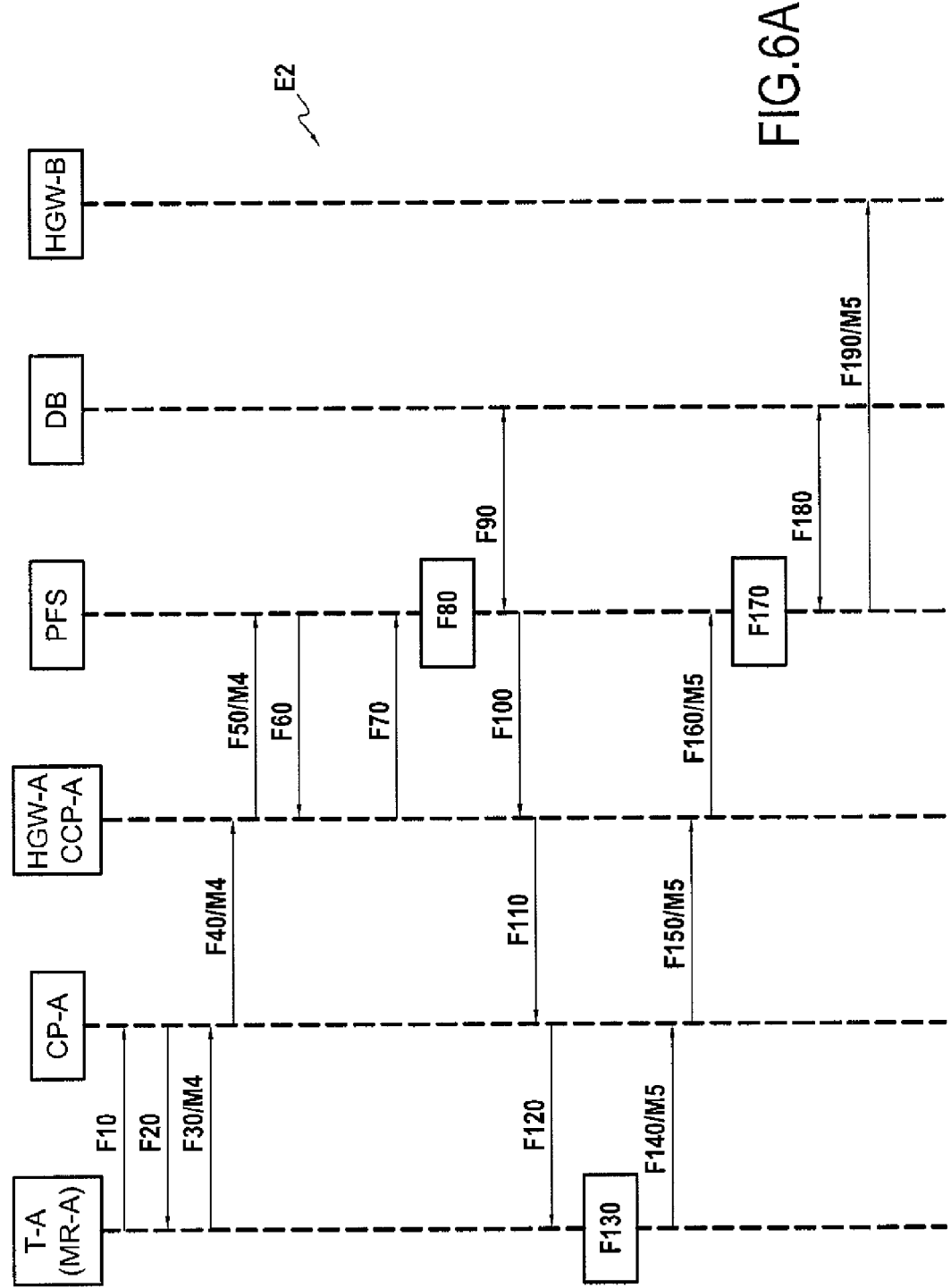
Figure 6B:
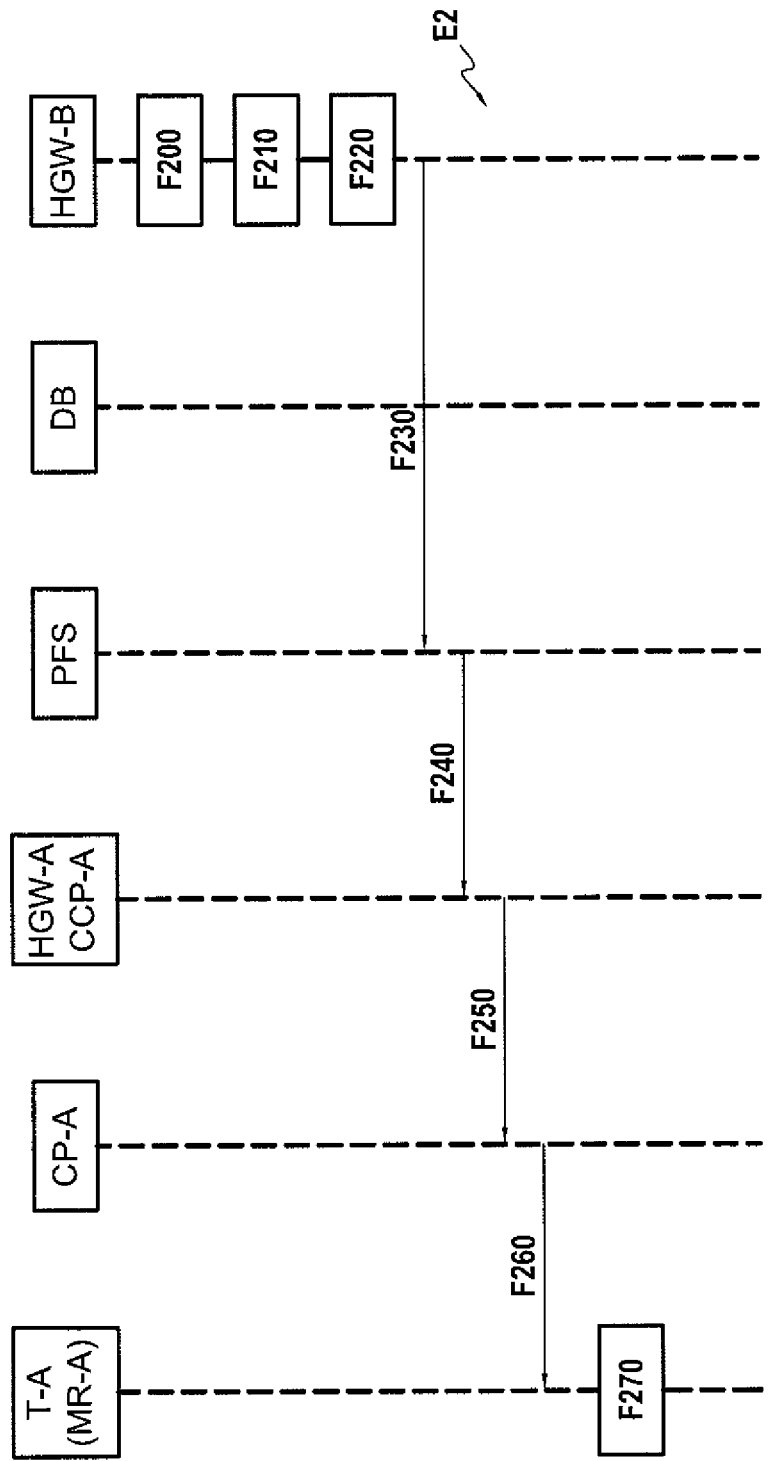
Figure 7:
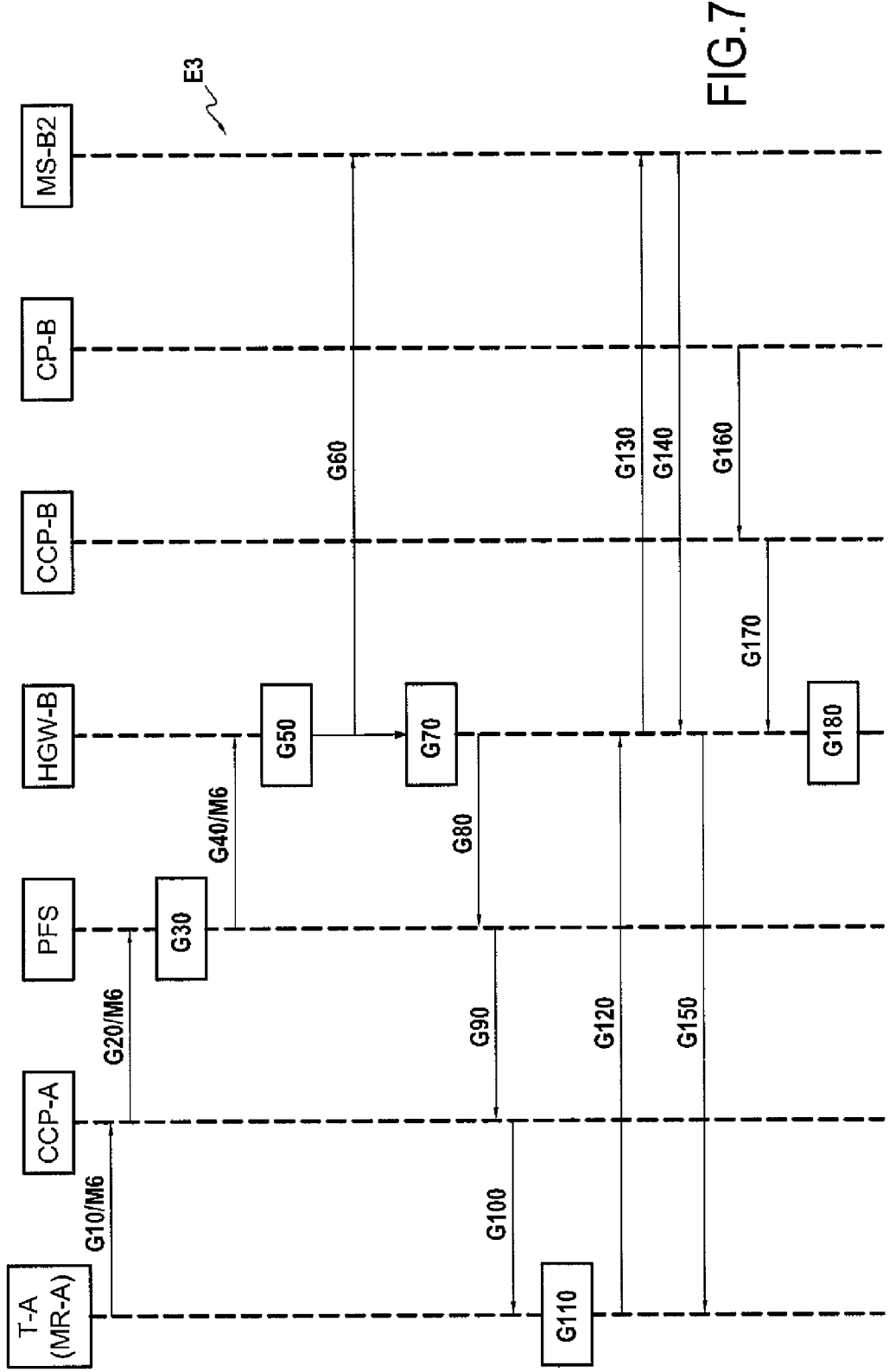

In the implementation described herein, three distinct phases are envisaged for implementing the invention:

- a first stage E1 in which a catalog (i.e. a set) of multimedia contents belonging to Bob and indexed by the content servers MS-B1 and MS-B2 is shared with Alice. These contents include in particular the content C indexed by the server MS-B2. This first stage is shown in FIG. 5;
- a second stage E2 in which the catalog shared by Bob is consulted by Alice's terminal. This second stage is shown in FIGS. 6A and 6B; and
- a third stage E3 in which Alice's terminal accesses the content C. This third stage is shown in FIG. 7.

Figure 4A:
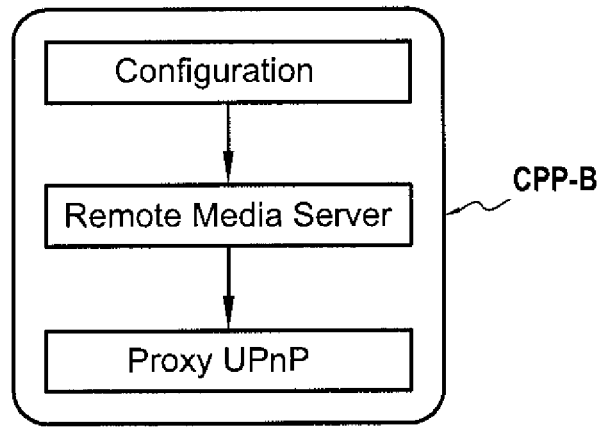
FIGS. 4A, 4B, and 4C are diagrams showing the various functions performed respectively by the control device, the gateway, and the trusted entity, in a particular implementation of the invention.
Figure 4B:
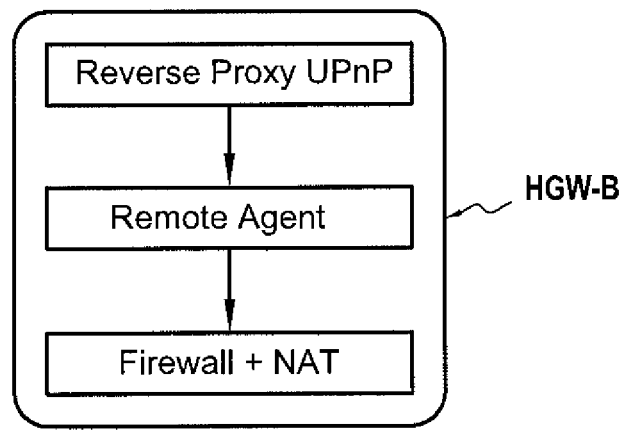
Figure 4C:
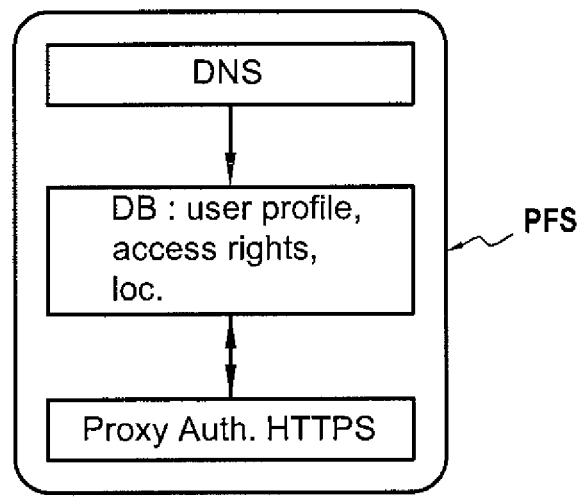

In order to facilitate understanding the invention and the role played by each entity during the stages E1, E2, and E3, FIGS. 4A, 4B, and 4C show the main functions performed in the presently-described implementation by the trusted entity PFS, by the home gateway HGW-B, and by the control device CCP-B.

Naturally, since the networks NW-A and NW-B are of identical structure in this example, these functions can equally well be performed by the gateway HGW-A and the control device CCP-A. Nevertheless, the example described herein envisages Bob sharing content C with Alice so the description below concentrates on the gateway HGW-B and the control device CCP-B.

With reference to FIG. 4A, the control device CCP-B performs the following functions:

- a configuration client function by defining access rules that are to be applied by the gateway HGW-B and the platform PFS and one or more redirection rules applied by the gateway HGW-B or by itself;
- a UPnP proxy function by transferring the UPnP requests to the platform PFS; and
- a remote content server function (or a remote media server function) by initially masking the content servers of the network NW-B, and subsequently by announcing a particular content server to the terminal T-A once assured that said terminal is authorized to access the server.

It is emphasized at this point that when the gateway HGW-B includes the control device CCP-B, the communication between these two entities is internal.

With reference to FIG. 4B, the gateway HGW-B performs the following functions:

- a remote agent function by implementing a firewall type configuration and a configuration for port redirection and for network address translation (NAT); and
- a UPnP reverse proxy function firstly by applying the access and redirection rules required by the control device CCP-B, and secondly by transferring incoming requests to the content server within the home network.

When the control device CCP-B performs the reverse UPnP proxy function, the redirection rules remain localized within the control device CCP-B.

Finally, with reference to FIG. 4C, the platform PFS performs the following functions:

- an authentication base function by registering users, by authenticating the users, and by storing access rules to be applied;
- a dynamic user locating function (or dynamic DNS), by establishing correspondence between a domain name and the IP address of the gateway HGW-B; and
- an HTTPS proxy function.

The stages E1, E2, and E3 are described below so as to illustrate the various functions performed by the platform PFS, the gateway HGW-B, and the control device CCP-B.

With reference to FIG. 5, during the stage E1, the user Bob initially uses his terminal T-B to select multimedia contents that he desires to share with Alice, i.e. that he desires to authorize Alice to access.

For this purpose, the terminal T-B sends an interrogation request to the control device CCP-B in order to identify the content servers and the contents available in its network (step E10). It should be observed that in the implementation described herein, it is the control device CCP-B that aggregates the various servers and contents that the user Bob can share.

On receiving this request, the control device CCP-B in turn interrogates the control point CP-B (step E20) so that it supplies the list of available content UPnP servers.

In known manner, the control point CP-B performs a central role in the UPnP protocol since it serves to discover the other UPnP devices of the network and the services and/or the contents offered by those devices.

The control point CP-B thus establishes the list of content servers available in the network NW-B and sends a response message to the control device CCP-B (step E30). In the example described herein, this list identifies the server MS-B1 and the server MS-B2.

The control device CCP-B transfers this list to the playback server MR-B of the terminal T-B, in response to its request (step E40).

Via his terminal T-B, Bob selects one of the servers from the list, here the server MS-B2, and sends the identifier of this server to the control device CCP-B (step E50).

On receiving this identifier, the control device CP-B interrogates the control point CCP-B in order to obtain the list of contents that are accessible on the server MS-B2 (step E60).

The list is obtained by the control point CP-B using means known to the person skilled in the art and then sent to the control device CCP-B (step E70). In this example this list includes in particular the content C.

The list is then transferred by the control device CCP-B to the server MR-B of the terminal T-B (step E80) so that Bob can select the content(s) he desires to share with Alice.

On receiving this list, Bob uses his terminal T-B to select the content C or the directory R in which the content C is located. The identifier of this content or of this directory is transmitted by the terminal T-B to the control device CCP-B (step E90).

It may be observed that in a variant, Bob can select a plurality of contents or directories indexed by the server MS-B2.

Once the directory or the content has been selected, the user Bob associates a catalog CA therewith. A plurality of contents or directories may be associated with a single catalog and any given content or directory may be associated with a plurality of catalogs.

In a variant of the invention, default catalogs are proposed to the user such as, for example: "Photo", "Audio", "Video", "Data".

Thereafter, still by means of his terminal T-B, the user Bob specifies the users to whom he desires to authorize access to the catalog CA and thus to the content C or to the directory R (step E100).

To do this, he accesses an address book stored by his terminal T-B and including a list of contacts. In this example, these contacts are identified by electronic addresses. In particular, Alice is identified in this list by her email address ID-A.

In a variant, other identifiers may be considered. Furthermore, the address book from which Bob selects Alice's address need not be stored in the terminal T-B, but could be obtained for example from the services platform PFS.

In a message M1, the terminal T-B sends Alice's identifier ID-A to the control device CCP-B in association with the catalog CA, the UPnP identifiers (or universal unique identifier (UUID)) of the content C or of the directory R and of the server MS-B2 (step E110). The message M1 is sent in the form of an HTTP request.

By means of the message M1, Bob thus authorizes a user of the network NW-A using the identifier ID-A to access the catalog CA referencing the content C or the directory R that is indexed by the server MS-B2. The association of the address ID-A with the identifiers of the content C or of the directory R, and with the server MS-B2 within the catalog CA in the message M1 constitutes an access rule RA in the meaning of the invention.

In equivalent manner, it may be observed that the access rule RA could be transmitted to the control device CCP-B in a succession of messages: for example, one message containing the identifier of the server MS-B2, one message containing the identifier of the content C or of the directory R, one message containing the identifier of the catalog CA, and one message containing the identifier ID-A. This succession of messages then constitutes a message containing an access rule in the meaning of the invention.

On receiving the request M1, the control device CCP-B sends a notification message M2 to the platform PFS, which message contains a remote access rule RAD associating Alice's identifier ID-A with Bob's identifier ID-B (step E120).

The remote access rule RAD is derived from the access rule RA: according to this remote access rule Alice is authorized to access contents or more generally catalogs of contents belonging to Bob.

The service platform PFS then updates the authentication database DB by inserting into the user profile P-A the sharing rule RAD extracted from the message M2 in association with Bob's identifier ID-B (step E130).

Thereafter, the services platform PFS informs the terminal T-A that Bob has authorized Alice to access the contents C (step E150), e.g. by means of an email sent using the identifier ID-A. This step is naturally optional.

Simultaneously, the control device CCP-B sends a notification message M3 to the gateway HGW-B containing a local access rule RAL derived from the access rule RA together with a redirection rule RR1 that is to be applied by the gateway (step E160).

The local access rule RAL contained in the message M3 seeks to configure the gateway so that it returns the catalog CA on receiving a request to interrogate the catalog coming from the user Alice (i.e. associated with Alice's identifier ID-A), by means of the services platform PFS.

The redirection rule RR1 associated with the local access rule RAL for the catalog CA seeks to configure the gateway so that it transfers to the content server MS-B2 any request to consult the catalog CA in order to access the content C or to consult the directory R that it receives from Alice via the services platform PFS.

Furthermore, still according to the local access rule RAL, the gateway HGW-B is configured so as to reject any request relating to a content of the network NW-B and that does not come from the platform PFS. The origin of the request may be detected, in known manner, by examining the IP addresses contained in the request and by comparing them with the public IP address of the platform PFS as contained in the redirection rule RR1.

In a variant, a static rule may also be configured in the home gateway on initializing the service, so as to authorize only requests that come from the PFS.

It should be observed that by means of this configuration, the services platform PFS acts as a trusted third party for the network NW-B.

The gateway HGW-B updates its reverse proxy configuration with the help of the redirection rule RR1 extracted from the message M3 using means that are known to the person skilled in the art and not described herein (step E170). Thus, after this step, the gateway HGW-B applies the redirection rule RR1 to any access request relating to the content C or the directory R.

The gateway HGW-B also stores the access rule RAL and the redirection rule RR1 in a non-volatile memory (e.g. in a flash memory).

This configuration of the gateway HGW-B closes the stage E1 in which Bob selects a catalog of one or more contents or directories for sharing.

With reference to FIG. 6A, there then follows the stage E2 of Alice consulting the contents that she can access.

The terminal T-A sends an interrogation request to the control point CP-A in order to obtain the list of available content servers (step F10).

This list is sent by the control point CP-A to the playback server MR-A of the terminal T-A (step F20). This list includes in particular the content servers MS-A1 and MS-A2 hosted in the local network NW-A, and also a remote content server MS-D.

The remote content server MS-D symbolizes all of the servers and/or contents that are located remotely and accessible from the network NW-A. Nevertheless, the precise details and locations of these servers and/or contents are masked for the terminal T-A: they appear in the form of a single remote server MS-D. Thus, the servers MS-B1 and MS-B2 together with their contents are not announced and identified as such to the pieces of equipment making up the network NW-A.

The terminal T-A selects the remote content server MS-D via the playback server MR-A and sends an interrogation request M4 to the control point CP-A in order to consult the contents available on the remote server MS-D (step F30).

The control point CP-A transfers this interrogation request M4 to the control device CCP-A (step F40).

In accordance with the invention, the control device CCP-A is configured so as to transfer to the services platform PFS all requests coming from a user of the network NW-A relating to at least one catalog or at least one multimedia content hosted in the network NW-B.

In one possible implementation, this redirection is performed automatically by configuring the control device CCP-A so that it uses an HTTP proxy of the services platform PFS. This configuration, similar to that of a web browser, is known to the person skilled in the art.

Since the interrogation request M4 constitutes such a request, the control device CCP-A transfers it to the platform PFS (step F50) in order to obtain a catalog of multimedia contents hosted in the network NW-B to which Alice has authorization to access.

On receiving the request M4, the platform PFS identifies the user from which the request originates. This authentication of Alice with the platform PFS is managed transparently by the control device CCP-A on behalf of Alice, with this taking place independently of the terminal that Alice is using. In other words, this authentication advantageously does not require any interaction with Alice's terminal T-A.

More precisely, for this purpose, the services platform PFS sends a request to the control device CCP-A in order to obtain Alice's identifier and an associated password (step F60).

The control device CCP-A responds to the platform PFS by supplying the identifier ID-A together with the password PWD-A (step F70) in the form of an HTTPS request so that it can proceed to authenticate Alice.

On receiving this data, the platform PFS authenticates Alice by means of the control device CCP-A by verifying that the identifier ID-A and the password PWD-A do indeed correspond to the identification data and the authentication data recorded in the profile of user A, in the database DB (step F80).

If the data does not correspond, the platform PFS sends an error notification to the control device CCP-A, thereby rejecting access to the network NW-B for the user identified by ID-A. This notification is forwarded by the device CCP-A to the terminal T-A.

In the example described herein, the identifier ID-A and the password PWD-A correspond to data registered in the profile P-A such that the services platform validly authenticates the control device CCP-A.

Following this authentication, it interrogates the database DB to read the list of correspondents who accept to share contents with the identifier ID-A, i.e. with the user Alice (step F90).

This list may be prepared by analyzing the remote access rules associated with the identifier ID-A (i.e. with the user Alice) in the database DB. In the presently-envisaged example, only the user Bob identified by his identifier ID-B accepts content sharing with Alice via the remote access rule RAD.

The platform PFS sends the list made up of the identifier ID-B to the control device CCP-A in the form of an XML file in UPnP format (step F100).

In a variant implementation, the platform PFS also sends the DNS name Name-NW-B of the network NW-B that is associated with the identifier ID-B.

This list is transferred by the control device CCP-A to the control point CP-A (step F110), which in turn transfers to the playback server MR-A of the terminal T-A (step F120).

Alice views the list of correspondence accepting to share content with her, in this example Bob, on the playback server MR-A.

Using her terminal T-A she selects Bob's identifier ID-B (step F130).

Thereafter, using her terminal T-A, Alice sends a request M5 to the control point CP-A in order to obtain the list of contents being shared by Bob (step F140).

This request M5 is transferred by the control point CP-A to the control device CCP-A (step F150). The request M5 is a request coming from a user of the network NW-A relating to a catalog or at least to a multimedia content hosted in the network NW-B in the meaning of the invention.

Consequently, in accordance with this configuration, the control device CCP-A in turn transmits the request M5 in the form of an HTTPS request to the platform PFS (step F160).

As before, on receiving the request M5, the services platform PFS authenticates the user originating the request by interrogating the control device CCP-A (step F170). This new authentication is carried out in similar manner to the authentication performed in steps F60-F80, i.e. in a manner that is transparent for Alice's terminal T-A.

In a variant of the invention, the services platform PFS can manage states and thus store the first authentication of Alice performed by means of the control device CCP-A during the steps F60-F80 so that it does not need to ask for authentication again. This procedure may be implemented with the help of "cookies" and is known to the person skilled in the art.

Once the control device CCP-A has been authenticated (in other words once Alice has been authenticated), the services platform PFS also verifies whether Alice benefits from a remote access rule giving access to contents belonging to Bob (step F180).

For this purpose, the platform interrogates the database DB once more using the identifier ID-B.

If authentication fails or if the platform PFS determines that Alice does not have the right to access any of Bob's contents, the request is rejected and an error notification is sent to the control device CCP-A, which relays it to the terminal T-A via the control point CP-A.

In the presently-described example, the user using the identifier ID-A is indeed authorized by the remote access rule RAD to access contents belonging to Bob.

The services platform PFS therefore transfers the request M5 to the gateway HGW-B (step F190), for which it obtains the IP address by consulting Bob's profile in the database DB.

In a variant of the invention, the platform PFS obtains the IP address of the gateway HGW-B by consulting the DNS system using the name Name-NW-B of the network NW-B as stored in the database DB and associated with the identifier ID-B.

It also inserts into the transferred request M5 the identifier ID-A used by the control device CCP-A for authenticating Alice.

As mentioned above, the gateway HGW-B is configured by the local access rule RAL so as to accept HTTPS requests relating to a content of the network NW-B, solely when it comes from the platform PFS.

Thus, with reference to FIG. 6B, on receiving the request M5, the gateway HGW-B begins by verifying that this request does indeed come from the platform PFS (step F200). To do this, it extracts the IP address of the platform PFS as contained in known manner in the request M5 and compares it with the IP address specified in the redirection rule RR1.

In the presently-envisaged example, the two IP addresses coincide.

The gateway then extracts from the request M5 Alice's identifier ID-A as used by the control device CCP-A in order to verify that it is indeed authorized by a local access rule RAL to access content on Bob's network (step F210). This avoids a dishonest terminal usurping an identity by managing to obtain the IP address of the platform PFS.

It should be observed that if the identifier ID-A extracted from the request M5 does not correspond to an identifier authorized by a local access rule stored in the memory 22, the gateway HGW-B sends an error notification to the services platform.

In the presently-described example, the identifier ID-A is authorized to access contents belonging to Bob by the local access rule RAL.

The gateway HGW-B then dynamically constructs the catalog CA of the contents to which Bob authorizes access by Alice (step F220), with the help of the local access rule RAL stored in its memory 22 during step E170.

The catalog CA, which in this example contains only the reference to the content C, is then sent by the gateway HGW-B in the form of an XML file in UPnP format to the platform PFS (step F230). The file is included in an HTTPS message.

The services platform PFS transmits this catalog to the control device CCP-A (step F240), which in turn relays it to the control point CP-A (step F250) for transmission to the playback server MR-A (step F260).

Using her terminal T-A, Alice then selects the content C from the catalog CA that has been supplied to her (step F270).

It should be observed that when the catalog CA comprises a plurality of directories, the procedure for consulting a directory is identical to the procedure for consulting a catalog except that, on reaching the gateway HGW-B, Alice's request is redirected to the content server MS-B2 in application of the redirection rule RR1 applied by the gateway HGW-B.

Figure 6C:
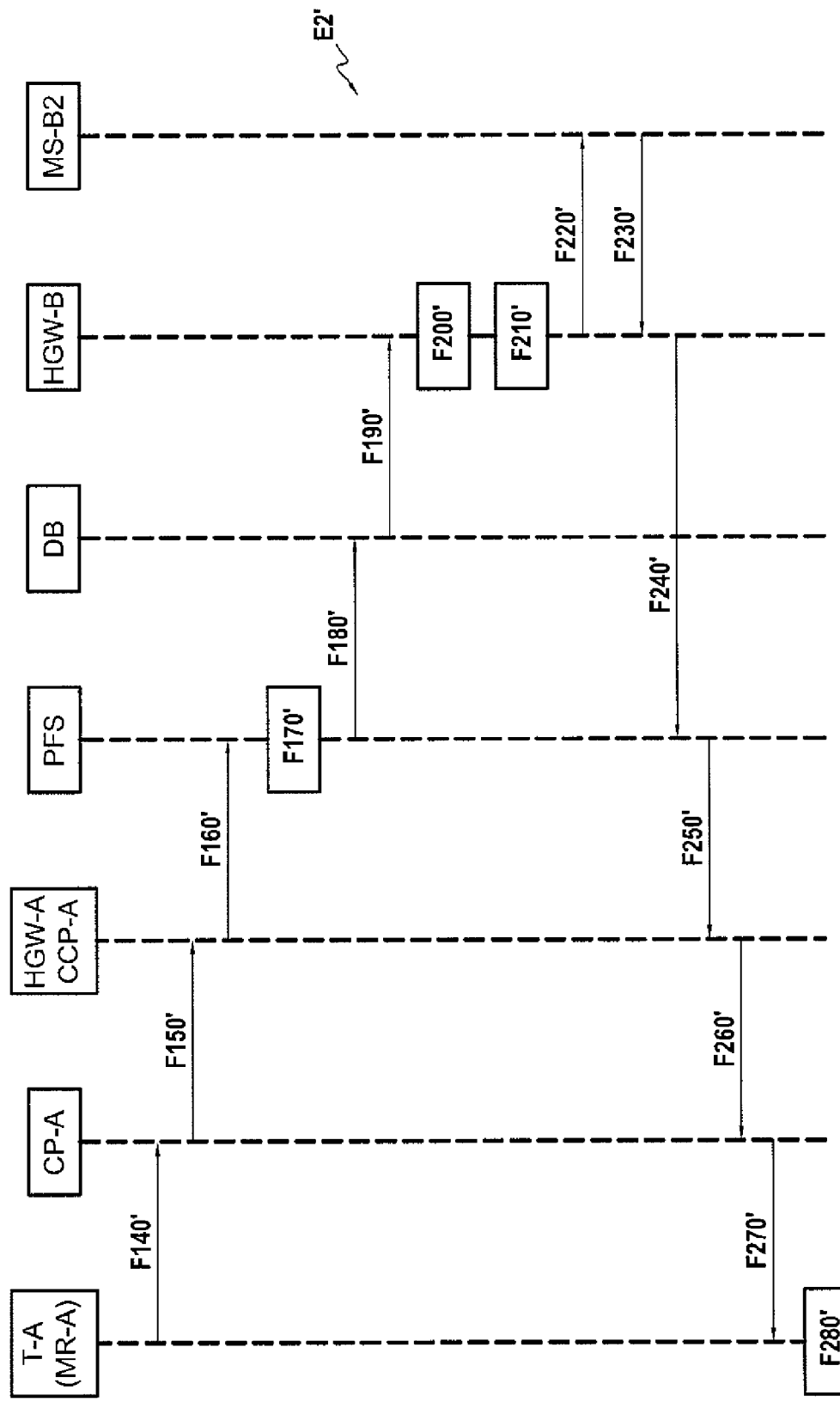

FIG. 6C shows an example of the procedure of consulting a directory R of the catalog CA. The following steps are similar to the steps F140 to F210 as described above:

F140' sending a request M5' to the control point CP-A in order to consult a directory R of the catalog CA;
F150' of transferring said request to the device CCP-A;
F160' of transferring said request by the control device CCP-A to the services platform PFS;
F170' of authentication performed by the services platform PFS;
F180' of verification that Alice is authorized by a remote access rule to access Bob's directory;
F190' of transferring the request M5' to the gateway HGW-B;
F200' of the gateway HGW-B verifying that the request M5' does indeed come from the platform PFS; and
F210' of verifying that Alice is authorized by a local access rule to access a content of Bob's network.

As mentioned above, in accordance with the redirection rule RR1, the gateway HGW-B is configured so as to transfer to the content server MS-B2 any request to consult a directory R of the catalog CA that it receives from Alice via the services platform PFS.

Since the request M5' constitutes such a request, the gateway HGW-B transfers the request M5' to the server MS-B2 (step F220').

In response to the request M5', the server MS-B2 returns the directory R to the gateway HGW-B (step F230').

The directory R is then sent by the gateway HGW-B in the form of an XML file in UPnP format to the platform PFS (step F240'). This file is included in an HTTPS message.

The services platform PFS transmits this directory to the control device CCP-A (step F250'), which in turn relays it to the control point CP-A (step F260') for transmission to the playback server MR-A (step F270').

Recursively, the steps F140' to F270' make it possible to consult subdirectories within the directory R in the catalog CA.

Using her terminal T-A, Alice then selects the content C in the directory R that has been supplied to her (step F280').

Alice uses her terminal T-A to select the content C in the catalog CA or in the directory R of the catalog CA marks the end of the stage E2.

With reference to FIG. 7, once the content C has been selected, Alice uses her terminal T-A to request access to the content C, in other words, in this example, to view it. The request MG from the terminal T-A to access the content C is sent to the control device CCP-A (step G10) which forwards it to the services platform PFS (step G20).

On receiving the access request M6, the platform PFS authenticates once more the user from whom the request comes (i.e. Alice) and verifies that she is associated with a rule for accessing the content C, as described above for stage E2 (step G30). In the event of authentication failing, or if the platform PFS determines that Alice does not have the right to access the content C, the request is rejected and an error notification is sent to the control device CCP-A, which relays it to the terminal T-A via the control point CP-A.

In a variant of the invention, and as in step F170, authentication may be stored during steps F60-F80 so that it does not need to be repeated.

Once Alice has been authenticated, the services platform PFS transfers the request M6 to Bob's home network, in other words to the gateway HGW-B (step G40).

The gateway HGW-B verifies the request by verifying firstly whether it comes from the platform PFS (in similar manner to step F200), and secondly whether it relates to an identifier for which there exists a local access rule giving access to the content C, as described above for stage E2 (step G50).

In the presently-described example, such a rule does indeed exist, in other words, the user identified by ID-A is authorized to access the content C indexed by the server MS-B2.

The gateway HGW-B then transfers the request M6 to the content server MS-B2 in accordance with the redirection rule RR1 (step G60). If no rule exists for authorizing Alice to access the content C, then the request M6 is rejected by the gateway.

Furthermore, in the presently-described implementation, the gateway HGW-B uses its remote agent function to update itself dynamically with a new redirection rule RR2 whereby requests to access the content C coming from the network NW-A authenticated by means of the control device CCP-A are redirected directly to the content server MS-B2 (step G70).

In the presently-envisaged example, this redirection rule uses the IP address of the gateway HGW-A through which all requests to a network outside the network NW-A pass, and that the gateway HGW-A inserts in the requests in a manner known to the person skilled in the art.

In a variant of the invention, the IP address may be inserted by the control device CCP-A or by the services platform PFS into the request M6.

In another variant of the invention, the IP address may be obtained from a DNS request concerning the name Name-NW-A of the first network NW-A, itself inserted by the control device CCP-A or the services platform PFS in the request M6.

Thereafter the gateway HGW-B sends a redirection message to Alice via the control device CCP-A (e.g. "http redirect") giving its public IP address, @IP-B, together with the port to which requests from Alice should be sent in order to access the content C. The purpose of this message is to enable the terminal T-A to access the gateway HGW-B directly without passing via the platform PFS.

This redirection message transits via the services platform PFS (step G80) and via the control device CCP-A (step G90) before reaching the terminal T-A (step G100).

On receiving this redirection message, the terminal T-A extracts the public IP address @IP-B of the network NW-B and also the port requested by the gateway HGW-B (step G110).

It then uses these parameters to send a request directly to the network NW-B, and more precisely to the gateway HGW-B, for access to the content C, which gateway then transmits it in application of the redirection rule RR2 to the server MS-B2 (steps G120 and G130). This server then acts in turn to send the content C to the terminal T-A (steps G140 and G150).

Once access to the content C has terminated, the control point CP-B signals this termination to the control device CCP-B (step G160).

The control device CCP-B then sends a message to the gateway HGW-B requesting it to delete the redirection rule RR2 in the gateway (step G170).

The gateway HGW-B deletes the redirection rule RR2 (step G180), such that direct access to the network NW-B by a terminal of the remote network NW-A is no longer possible.

In order to make sure that the redirection rule RR2 is indeed deleted under all circumstances, including under error circumstances, the control device CCP-B uses a timeout and the gateway HGW-B or the control device CCP-B tracks the connection to monitor content being exchanged between the two remote local networks and in order to terminate the redirection rule RR2 if an error is detected.

In the embodiment described, the control device CCP-B starts the timeout for the current session. At the end of the period defined by the timeout, the control device CCP-B sends a message to the gateway HGW-B requesting it to delete the redirection rule RR2. A disconnection message is sent by the control device CCP-B to the control device CCP-A to inform the user to whom the content C is being played back that the session has terminated.

In the implementation described, and in addition to this timeout, in order to be closer to the utilization of the service by the user, the gateways HGW or the control devices CCP perform connection tracking. This makes it possible to validate proper connection between the two remote local networks and the absence of messages being lost, where the detection of such a loss makes it necessary to increase the timeout. Connection tracking enables shorter timeout values to be used that are regularly refreshed so long as the connection tracking has not detected a breakdown in data exchanges. In the event of an error, the gateway HGW-B (or the control device CCP-B) automatically deletes the redirection rule RR2 and sends a message to the control device CCP-B to warn it of the end of the session. The gateway HGW-A sends a message to the control device CCP-A so that it can warn the terminal T-A that access to the content C has come to an end.

In the implementation described, since the UPnP protocol is itself transported by the HTTP protocol, it is the HTTP protocol that is used by all of the multimedia equipment of the local network using the UPnP protocol. The home gateway and the control device use the HTTP protocol for communicating and exchanging messages within the local network, and the HTTPS protocol for communicating and exchanging messages with the services platform PFS. Changes from the HTTP protocol to and from the HTTPS protocol are organized by the home gateway HGW or the control device CCP.

In an implementation that is less secure, only the HTTP protocol is used.

In the presently-described implementation, the UPnP entities of the networks NW-A and NW-B (including in particular the terminals, the control devices, and the gateways) form a home network. Nevertheless, the invention is also applicable when these entities are co-located in a single piece of equipment (which then on its own constitutes a network in the meaning of the invention), such as for example a UPnP laptop computer in a roaming situation, having a router modem complying with a third-generation mobile telecommunications standard (e.g. UMTS) or fitted with a WiFi interface, acting as a gateway giving access to the network of the trusted entity via a third-generation mobile telecommunications network or via a WiFi "hotspot".

The description is given above for an A/V service using the UPnP protocol. It is equally applicable to any other protocol whether standardized or not, such as the proprietary "Bonjour" protocol developed by the supplier Apple.

The invention claimed is:

1. A control method implemented by a control device (CCP-B) of a first network (NW-B), the method comprising:
   a step (E110) of receiving a message (M1) sent by a user (T-B) of the first network, said message containing an access rule authorizing a user of a second network to access at least one multimedia content (C), said content being indexed with a content server (MS-B2) of the first network;
   a step (E120) of sending a first notification message (M2) to a trusted entity (PFS) managing the interface between the first network (NW-B) and the second network (NW-A), the first notification message (M2) containing a remote access rule (RAD) authorizing said user of the second network to access multimedia contents belonging to said user of the first network;
   a step (E130) of configuring said trusted entity to use said remote access rule upon reception of an access request to the multimedia content of the first network from said user of the second network; and
   a first command step (E160) of commanding a gateway (HGW-B) of the first network (NW-B) by means of a local access rule configuring said gateway, such that said gateway transmits a catalog of contents to which said user of the second network is authorized to access on reception of an access request relating to said catalog coming from said user of the second network via said trusted entity (PFS).

2. A control method according to claim 1, wherein the first command step (E160) comprises sending a second notification message (M3), said second message including said local access rule and a redirection rule whereby the gateway transfers a received request for access to a determined content to a content server (MS-B2).

3. A control method according to claim 1, further comprising:
   a first step (E40) of sending a list to the user (T-B) of the first network, the list including at least one content server of the first network indexing multimedia contents; and
   on reception (E50) of a selection of a server (MS-B2) in said list made by the user of the first network, a step (E60) of sending to that user a list of multimedia contents indexed with said server in order to enable at least one multimedia content (C) to be selected that the user of the first network authorizes a user of the second network to access.

4. A control method according to claim 1, further comprising:
   a step (G160) of detecting the end of access to multimedia content (C) by the user of the second network (T-A); and
   a second command step of configuring said gateway (G170) so as to deactivate a redirection rule applied by said gateway, and whereby the gateway transfers to the server (MS-B2) indexing the multimedia content (C), a request for access to said content as received from a user of a second network (T-A).

5. A method of implementing an interface between a first network (NW-B) and a second network (NW-A), the method being performed by a trusted entity (PFS), said method comprising:
- a step (E120) of receiving a notification message (M2) from a control device of the first network, the notification message (M2) containing a remote access rule (RAD) authorizing a user of the second network to access multimedia contents of a user of the first network;
- a step (E130) of configuring said trusted entity to use said remote access rule upon reception of an access request to the multimedia content of the first network from said user of the second network;
- a step (F160,G20) of receiving an access request (M5,M6), coming from said user (T-A) of the second network (NW-A) relating to at least one multimedia content of said user of the first network (NW-B);
- a verification step (F180) seeking to verify that said user of the second network is authorized to access multimedia contents of said user of the first network by means of the remote access rule;
- if said user of the second network is so authorized, a transfer step (F190,G40) of transferring the access request to a gateway (HGW-B) of the first network; and
- else a step of rejecting the request.

6. A method of implementing an interface according to claim 5, further comprising, prior to the transfer step, a step (F170,G30) of authenticating said user of the second network, the transfer step being implemented once the user of the second network has been validly authenticated.

7. A treatment method implemented by a gateway (HGW-B) of a first network (NW-B), said method comprising:
- a configuration step (E170) of configuring the first network by means of a local access rule received from a control device (CCP-B) of the first network, and configuring said gateway so that, on receiving an access request from a user of the second network via a trusted entity (PFS) forming an interface between the first network and the second network, with said request relating to a catalog of multimedia contents of a user of the first network, said gateway transmits said catalog of multimedia contents which said user of the second network is authorized to access;
- on reception (F190) of a request (M5) to access said catalog of contents coming from said user of the second network, a verification step (F210) seeking to verify that said user of the second network is authorized to access said catalog;
- if said user of the second network is so authorized:
  - a step (F220) of obtaining the catalog; and
  - a step (F230) of sending said catalog to said trusted entity (PFS); and
- else a step of rejecting the request, wherein the trusted entity is configured to use a remote access rule upon reception of an access request to the multimedia content of the first network from said user of the second network.

8. A treatment method according to claim 7, wherein the configuration step is implemented on reception of a notification message (M3) including the local access rule and a redirection rule whereby the gateway transfers to a content server (MS-B2) a received request to access a determined content (C).

9. A treatment method according to claim 7, further comprising:
- a step (G70) of reconfiguring said gateway with the help of a redirection rule whereby said gateway accepts a request for access to multimedia content (C) received from a user of the second network and transfers it to said server (MS-B2) indexing said content; and
- a step (G80) of sending an IP address (@IP-B) of said gateway to the user of the second network via the trusted entity.

10. A transfer method implemented by a control device (CCP-A) of a first network (NW-A), the method comprising:
- on reception (F150) of an access request (M5) from a user (T-A) of the first network relating to at least one multimedia content of a user of a second network (NW-B) that said user of the first network is authorized to access by an access rule, a step (F160) of interrogating a trusted entity (PFS) forming an interface between the first network and the second network in order to obtain a catalog of contents; and
- a step (G20) of transferring a request (M6) to access multimedia content (C) selected by the user from said catalog, the request coming from the user (T-A) of the first network and going to the trusted entity (PFS), wherein the trusted entity is configured to use a remote access rule upon reception of an access request to the multimedia content of the first network from said user of the second network.

11. A control device (CCP-B) for controlling a first network (NW-B), the device comprising:
- means for receiving a message (M1) sent by a user (T-B) of the first network, said message containing an access rule authorizing a user of a second network to access at least one multimedia content (C), said content being indexed with a content server (MS-B2) of the first network;
- means for sending to a trusted entity (PFS) constituting an interface between the first network (NW-B) and the second network (NW-A), the first notification message (M2) containing a remote access rule authorizing a user of the second network to access multimedia contents belonging to a user of the first network; and
- command means for commanding a gateway (HGW-B) of the first network (NW-B) by means of a local access rule configuring said gateway, such that said gateway transmits a catalog of contents to which a user of the second network is authorized to access on reception of an access request relating to said catalog coming from a user of the second network via said trusted entity (PFS), wherein the trusted entity is configured to use the remote access rule upon reception of an access request to the multimedia content of the first network from said user of the second network.

12. A trusted entity implementing an interface between a first network (NW-B) and a second network (NW-A), the entity comprising:
- means for receiving a notification message (M2) from a control device of the first network, said message containing a remote access rule authorizing a user of the second network to access multimedia contents of a user of the first network;
- means for configuring said trusted entity to use said remote access rule upon reception of an access request to the multimedia content of the first network from said user of the second network;
- means for receiving an access request (M5,M6) from a user (T-A) of the second network (NW-A) relating to at least one multimedia content of a user of the first network indexed in the first network (NW-B);

verification means for verifying that said user of the second network is authorized to access multimedia contents of said user of the first network by means of the remote access rule;

means for transferring the access request to a gateway (HGW-B) of the first network, which means are activated if said user of the second network is authorized; and means for rejecting the request that are activated if the user is not authorized.

13. A gateway (HGW-B) of a first network (NW-B), the gateway comprising:

means for configuring the first network by means of a local access rule received from a control device (CCP-B) of the first network, adapted to configure said gateway so that, on receiving an access request from a user of the second network via a trusted entity (PFS) forming an interface between the first network and the second network, with said request relating to a catalog of multimedia contents of a user of the first network, said gateway transmits said catalog of multimedia contents that said user of the second network is authorized to access;

verification means, activated on reception of a request (M5) to access said catalog of contents coming from a user of the second network, and serving to verify whether said user of the second network is authorized to access said catalog;

means activated if said user of the second network is so authorized:

to obtain the catalog; and to send the catalog to said trusted entity (PFS); and means activated to reject the request if said user is not authorized, wherein the trusted entity is configured to use the remote access rule upon reception of an access request to the multimedia content of the first network from said user of the second network.

14. A control device (CCP-A) of a first network (NW-A), the device comprising:

means activated on reception of an access request (M5) from a user (T-A) of the first network relating to at least one multimedia content of a user of a second network (NW-B) that said user of the first network is authorized to access by an access rule (RA), to interrogate a trusted entity (PFS) forming an interface between the first network and the second network in order to obtain a catalog of contents; and means for transferring a request (M6) to access multimedia content (C) selected by the user from said catalog, the request coming from the user (T-A) of the first network and going to the trusted entity (PFS), wherein the trusted entity is configured to use the remote access rule upon reception of an access request to the multimedia content of the first network from said user of the second network.

\* \* \* \* \*